(12) United States Patent
Tornow et al.

(10) Patent No.: US 11,327,688 B2
(45) Date of Patent: May 10, 2022

(54) MASTER DATA PLACEMENT IN DISTRIBUTED STORAGE SYSTEMS

(71) Applicant: Cisco Technology, Inc., San Jose, CA (US)

(72) Inventors: Dominik Rene Tornow, San Jose, CA (US); Urmil Vijay Dave, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 55 days.

(21) Appl. No.: 16/741,580

(22) Filed: Jan. 13, 2020

(65) Prior Publication Data
US 2021/0216214 A1 Jul. 15, 2021

(51) Int. Cl.
G06F 3/06 (2006.01)
(52) U.S. Cl.
CPC ............ G06F 3/067 (2013.01); G06F 3/0604 (2013.01); G06F 3/0644 (2013.01); G06F 3/0647 (2013.01)
(58) Field of Classification Search
CPC ...... G06F 3/067; G06F 3/0604; G06F 3/0644; G06F 3/0647
See application file for complete search history.

(56) References Cited

U.S. PATENT DOCUMENTS

| 5,838,909 | A | 11/1998 | Roy et al. |
| 8,165,146 | B1 | 4/2012 | Melick et al. |
| 9,229,819 | B2 | 1/2016 | Patil et al. |
| 9,298,729 | B2 | 3/2016 | Hazlewood et al. |
| 2008/0010325 | A1* | 1/2008 | Yamakawa ........... G06F 3/0647 |
| 2013/0246588 | A1 | 9/2013 | Borowicz et al. |
| 2014/0173229 | A1 | 6/2014 | Reohr et al. |
| 2015/0019488 | A1* | 1/2015 | Higginson ............ G06F 16/214 |
|  |  |  | 707/634 |
| 2016/0210049 | A1* | 7/2016 | van Riel ............. G06F 11/3037 |

FOREIGN PATENT DOCUMENTS

CN 101577716 5/2012

OTHER PUBLICATIONS

International Search Report and Written Opinion from the International Searching Authority, dated Jun. 24, 2021, 12 pages, for corresponding International Patent Application No. PCT/US2021/014002.

* cited by examiner

Primary Examiner — Michelle T Bechtold
(74) Attorney, Agent, or Firm — Polsinelli PC

(57) ABSTRACT

Systems, methods, and computer-readable media for managing a placement of data items on a distributed storage system. In some examples, a method can include determining a location of a master copy of a data item on a distributed storage system, the location including a data store on the distributed storage system; determining an access pattern associated with the master copy of the data item, the access pattern including originating locations of access requests received by the distributed storage system for the master copy of the data item and a respective number of access requests received from each of the originating locations; determining, based on the access pattern, a different location on the distributed storage system for storing the master copy of the data item, the different location including a different data store on the distributed storage system; and placing the master copy of the data item at the different location.

12 Claims, 7 Drawing Sheets

MASTER DATA PLACEMENT IN DISTRIBUTED STORAGE SYSTEMS

TECHNICAL FIELD

The present technology pertains to distributed storage systems, and more specifically to master data placement in distributed storage systems.

BACKGROUND

The ubiquity of Internet-enabled devices has created an enormous demand for Internet services and content. In many ways, we have become an inter-connected society where users are increasingly reliant on network services and content. This Internet and inter-connectivity revolution has created significant challenges for content and storage providers who struggle to service a high volume of client requests while often falling short of performance expectations. For example, data providers typically need large and complex datacenters to keep up with network and data demands from users. These datacenters are often equipped with server farms configured to host specific data and services, and include numerous network devices configured to route and process data requests. In many cases, a specific datacenter is expected to handle millions of traffic flows and data requests.

Not surprisingly, such large volumes of data can be difficult to manage and create significant performance degradations and challenges. In some cases, load balancing solutions may be implemented to improve performance and service reliability. However, current load balancing solutions are prone to node failures, often fail to adequately account for dynamic changes and fluctuations in the network and data requests, and may be susceptible to latency and bottlenecks. Additional resources can be purchased and implemented to increase the capacity of the network and thereby reduce latency and performance issues. Unfortunately, this approach is expensive, introduces added complexity to the network, and remains susceptible to network fluctuations and varying data access patterns, which can lead to latency from overload conditions, waste from underload conditions, and highly variable performance.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
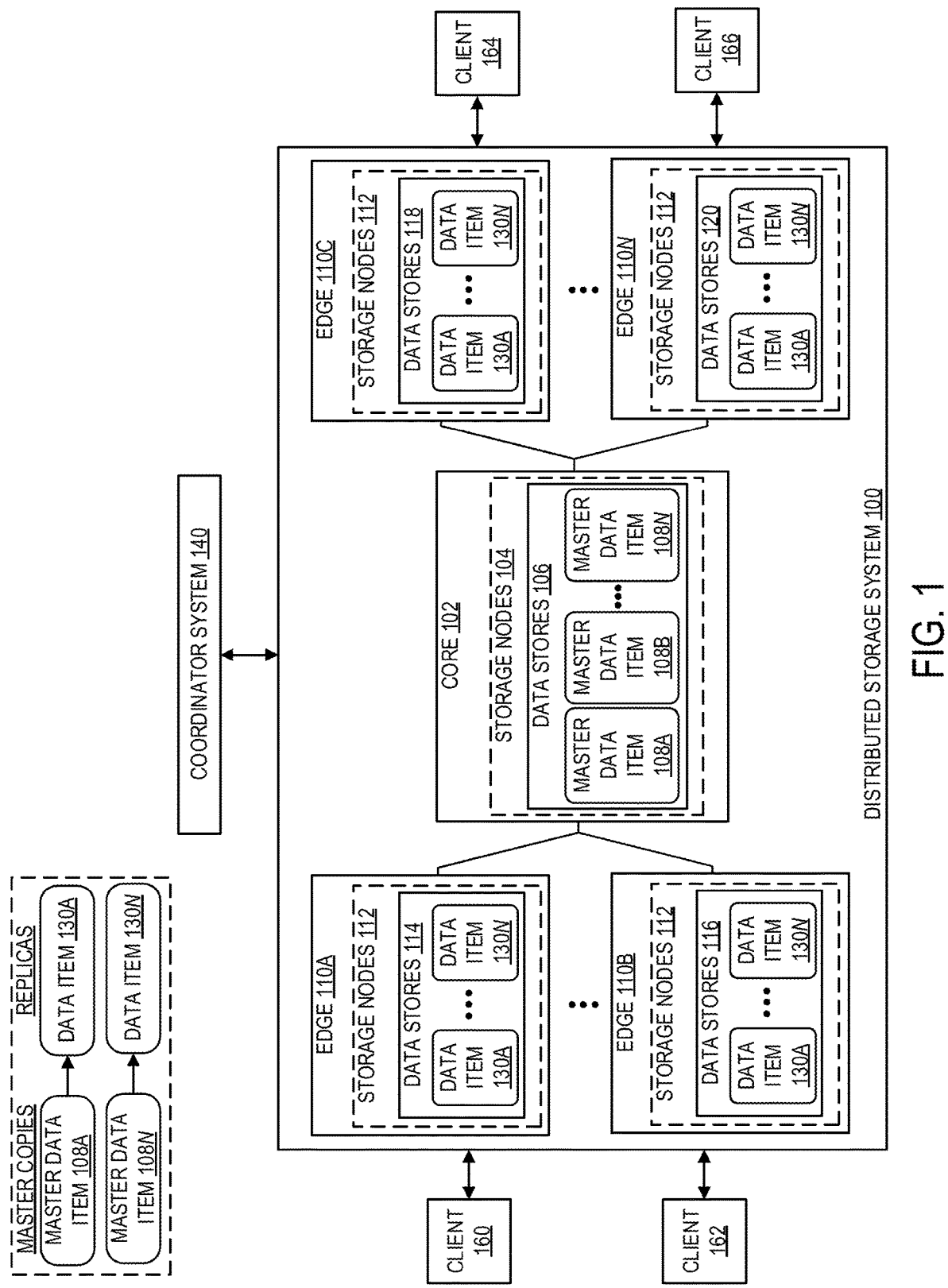
FIG. 1 illustrates an example distributed storage system, in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for intelligent and dynamic management of data item placements in distributed, stateful storage systems. The data placement techniques herein can reduce data access latencies and increase data access performance by intelligently placing master copies of data items in certain locations on a distributed storage system based on access patterns, network statistics, and/or events or conditions.

According to at least one example, a method for managing a placement of data items in a distributed storage system is provided. The method can include determining a current location of a master copy of a data item stored on a distributed storage system, wherein the current location of the master copy of the data item includes a current data store from a plurality of data stores on the distributed storage system; determining an access pattern associated with the master copy of the data item, the access pattern including one or more originating locations of a set of access requests received by the distributed storage system for the master copy of the data item and a respective number of access requests received from each of the one or more originating locations; determining, based on the access pattern associated with the master copy of the data item, a different location on the distributed storage system for storing the master copy of the data item, the different location including a different data store from the plurality of data stores; and placing the master copy of the data item at the different location on the distributed storage system.

According to at least one example, a system for managing a placement of data items in a distributed storage system is provided. The system can include one or more processors and at least one computer-readable storage medium having stored therein instructions which, when executed by the one or more processors, cause the system to determine a current location of a master copy of a data item stored on a distributed storage system, wherein the current location of the master copy of the data item includes a current data store from a plurality of data stores on the distributed storage system; determine an access pattern associated with the master copy of the data item, the access pattern including one or more originating locations of a set of access requests received by the distributed storage system for the master copy of the data item and a respective number of access requests received from each of the one or more originating locations; determine, based on the access pattern associated with the master copy of the data item, a different location on the distributed storage system for storing the master copy of the data item, the different location including a different data store from the plurality of data stores; and place the master copy of the data item at the different location on the distributed storage system.

According to at least one example, a non-transitory computer-readable storage medium for managing a placement of data items in a distributed storage system is provided. The non-transitory computer-readable storage medium can store instructions which, when executed by one or more processors, cause the one or more processors to determine a current location of a master copy of a data item stored on a distributed storage system, wherein the current location of the master copy of the data item includes a current data store from a plurality of data stores on the distributed storage system; determine an access pattern associated with the master copy of the data item, the access pattern including one or more originating locations of a set of access requests received by the distributed storage system for the master copy of the data item and a respective number of access requests received from each of the one or more originating locations; determine, based on the access pattern associated with the master copy of the data item, a different location on the distributed storage system for storing the master copy of the data item, the different location including a different data store from the plurality of data stores; and place the master copy of the data item at the different location on the distributed storage system.

In at least some aspects, the method, system, and non-transitory computer-readable storage medium described above can include collecting information associated with the distributed storage system, the information including statistics associated with one or more resources, one or more data access restrictions associated with one or more data items on the distributed storage system, one or more events, data access patterns, and/or network statistics associated with at least one of the distributed storage system and one or more networks associated with the distributed storage system, wherein the one or more resources include a storage node, a compute node, a virtual machine, a software container, a server, a network, and/or a networking device; based on the information associated with the distributed storage system, determining a data placement action estimated to improve a data access performance associated with one or more data items on the distributed storage system or improve a performance of the distributed storage system, the data placement action including moving at least one data item from at least one storage location to at least one different storage location, the at least one storage location and the at least one different storage location including different data stores from the plurality of data stores; and in response to determining the data placement action, moving the at least one data item from the at least one storage location to the at least one different storage location.

In some aspects, determining the different location on the distributed storage system for storing the master copy of the data item can include, based on the access pattern associated with the master copy of the data item, identifying, from the one or more originating locations, an originating location of a highest number of access requests associated with the master copy of the data item; determining which of the plurality of data stores is located closest to the originating location of the highest number of access requests associated with the master copy of the data item; and determining that the different data store associated with the different location is located closest to the originating location of the highest number of access requests associated with the master copy of the data item.

In some examples, the one or more originating locations can correspond to one or more client devices that generated the set of access requests received by the distributed storage system for the master copy of the data item. Moreover, in some examples, placing the master copy of the data item at the different location on the distributed storage system can include moving the master copy of the data item from the current data store to the different data store.

In some cases, determining that the different data store is located closest to the originating location of the highest number of access requests associated with the master copy of the data item can include determining that a number of hops between the different data store and the originating location is less than a respective number of hops between each of the plurality of data stores and each of one or more remaining locations from the one or more originating locations, and/or determining that a distance between the different data store and the originating location is less than a respective distance between each of the plurality of data stores and each of the one or more remaining locations from the one or more originating locations.

In some aspects, determining the different location on the distributed storage system for storing the master copy of the data item can include determining a second current location of a second master copy of a second data item stored on the distributed storage system, wherein the second current location of the second master copy of the second data item includes a second current data store from the plurality of data stores on the distributed storage system; selecting, based on the access pattern associated with the master copy of the data item and a second access pattern associated with the second master copy of the second data item, the different location on the distributed storage system for storing both the master copy of the second data item and the second master copy of the second data item; and placing both the master copy of the data item and the second master copy of the second data item at the different location on the distributed storage system.

In some examples, the second access pattern can include one or more respective originating locations of a second set of access requests associated with the second master copy of the second data item and a second respective number of access requests received from each of the one or more respective originating locations. In some cases, placing both the master copy of the data item and the second master copy of the second data item at the different location on the distributed storage system can include moving the master copy of the data item from the current location to the different location and moving the second master copy of the second data item from the second current location to the different location. Moreover, in some examples, the master copy of the data item can include a first partition of a partitioned data set and the second master copy of the second data item can include a second partition of the partitioned data set.

In some aspects, the method, system, and non-transitory computer-readable storage medium described above can include determining that the master copy of the data item and a second data item on the distributed storage system have been accessed together a threshold number of times; and after determining the different location on the distributed storage system for storing the master copy of the data item, moving the second data item from a current respective location of the second data item to the different location, the current respective location including one of the plurality of data stores on the distributed storage system.

the method, system, and non-transitory computer-readable storage medium described above can include determining that the master copy of the data item includes a reference to a particular copy of a second data item stored on the distributed storage system, wherein the particular copy of the second data item includes one of a respective master copy of the second data item or a replica of the respective master copy of the second data item; selecting, in response to determining the different location on the distributed storage system for storing the master copy of the data item and determining that the master copy of the data item comprises the reference to the particular copy of the second data item, the different location on the distributed storage system for storing the particular copy of the second data item; and moving the particular copy of the second data item from a respective location on the distributed storage system to the different location on the distributed storage system.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

Description

Distributed, stateful storage systems manage state across a network environment to provide read and write access to data items. In some examples, state can be managed in a centralized manner, with one or more data stores located in a central location, such as a core network, configured to manage read and write access to data items. Here, clients can perform read and write operations by sending requests to the one or more data stores in the central location. In some cases, read-only state replicas can optionally be managed in a decentralized manner. For example, read-only state replicas can be managed by one or more data stores located "at the edge" (e.g., caches) of the network. The one or more data stores at the edge of the network can manage read-only access to data items, and clients can perform read operations by sending requests to a decentralized data store (e.g., a cache) from the one or more data stores at the edge of the network.

While implementing data stores or caches at the edge of the network can improve performance for read operations, write operations can experience latency and reduced performance as the requesting clients are often located far from the data stores in the central location. For example, the distance between the clients and the centralized data stores providing such clients write access to data items can increase the latency and reduce the data access performance for write operations from such clients, as the added distance increases the number of networks, devices, and potential bottlenecks traversed by the data access communications between such clients and the centralized data stores.

In some cases, to reduce the latency and increase the data access performance for write operations from clients, the approaches herein can intelligently place master copies of data items at strategic locations on the distributed storage environment based on data access patterns such as data access locations (e.g., the location of a client relative to the data item) and frequency. For example, a master copy of a data item frequently accessed by a particular client can be moved to a data store located closer to the client based on the access patterns calculated for the client and/or the master copy of the data item. This can reduce the number of hops traversed by data access communications to and from the client, decrease the number of potential bottlenecks traversed by such data access communications, and generally decrease latency and increase data access performance for that client.

In some cases, other factors can also be considered when selecting a location for storing or moving a master copy of a data item. For example, when determining a strategic location to place a master copy of a data item (and/or a replica), the system can take into account various factors such as cost considerations, network performance considerations, client access requirements, client subscription levels (e.g., premium access levels, standard access levels, etc.), access patterns associated with a group of data items and/or clients, a type of data items, a relationship of a data item to other data items (e.g., a partition of a data item, a referencing data item, etc.), historical and/or predicted access patterns, etc.

Figure 2:
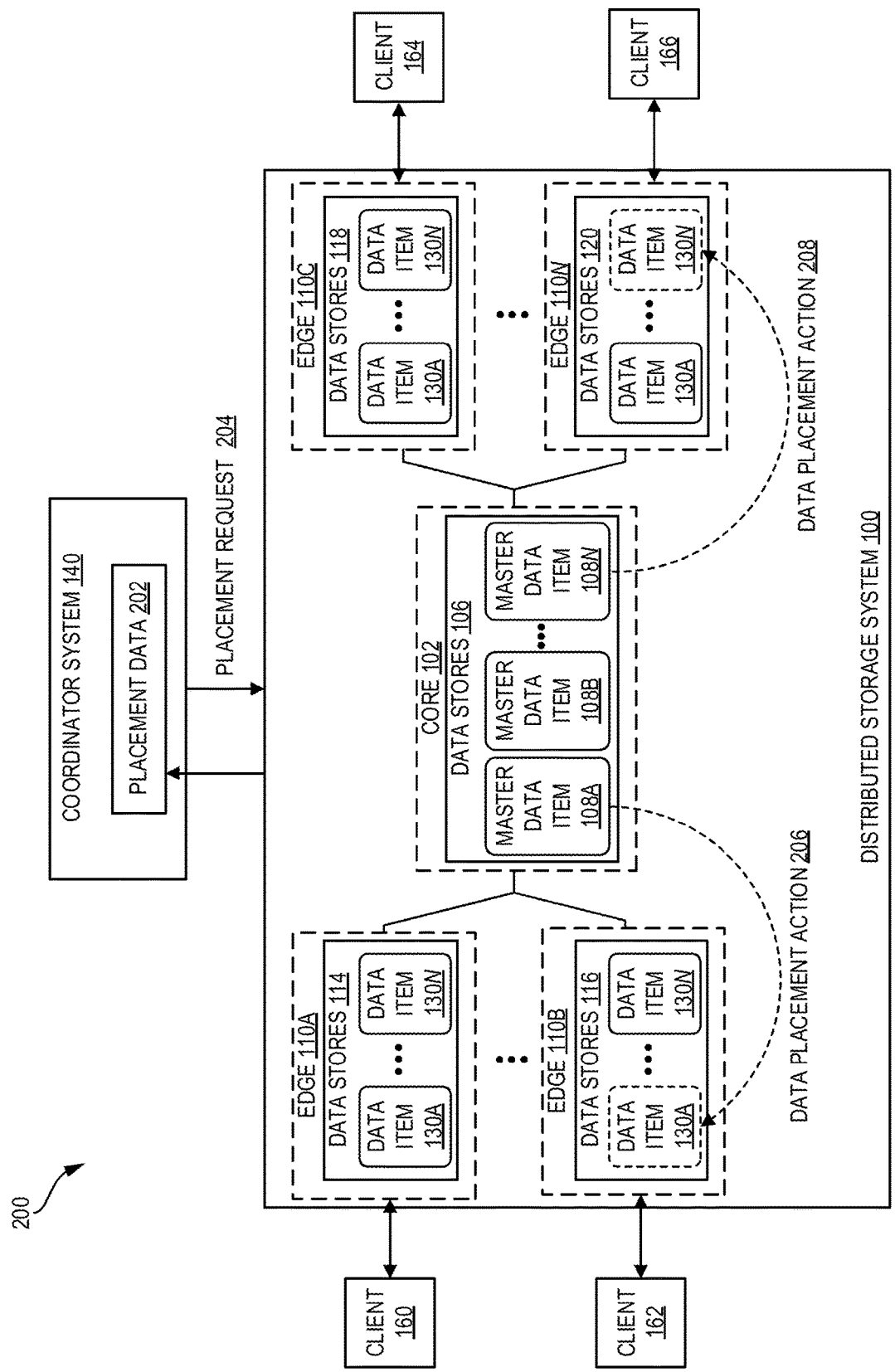
FIG. 2 illustrates an example data item placement scenario in a distributed storage system, in accordance with some examples.
Figure 3:
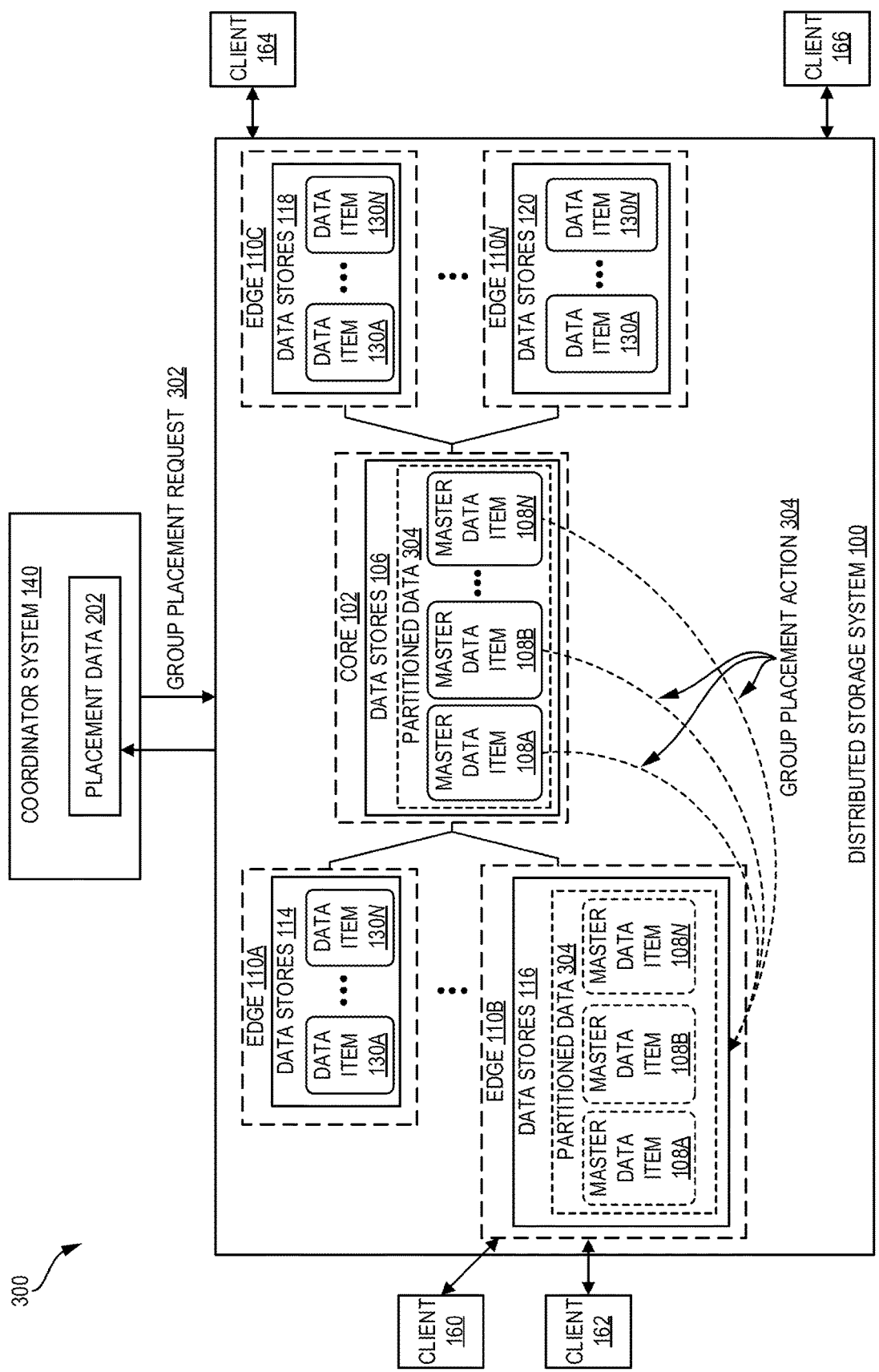
FIG. 3 illustrates an example group data item placement scenario in a distributed storage system, in accordance with some examples.
Figure 4:
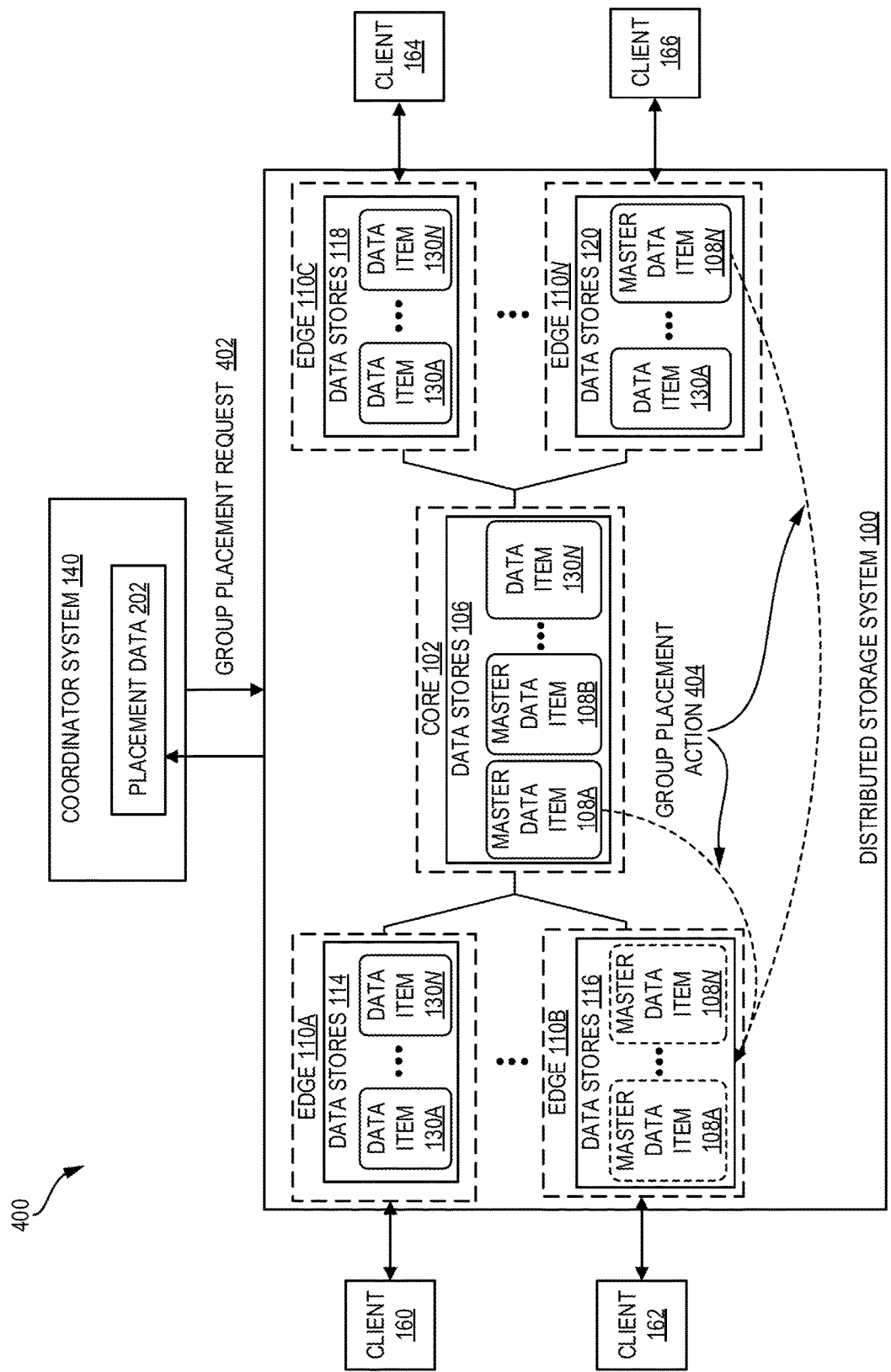
FIG. 4 illustrates another example group data item placement scenario in a distributed storage system, in accordance with some examples.
Figure 5:
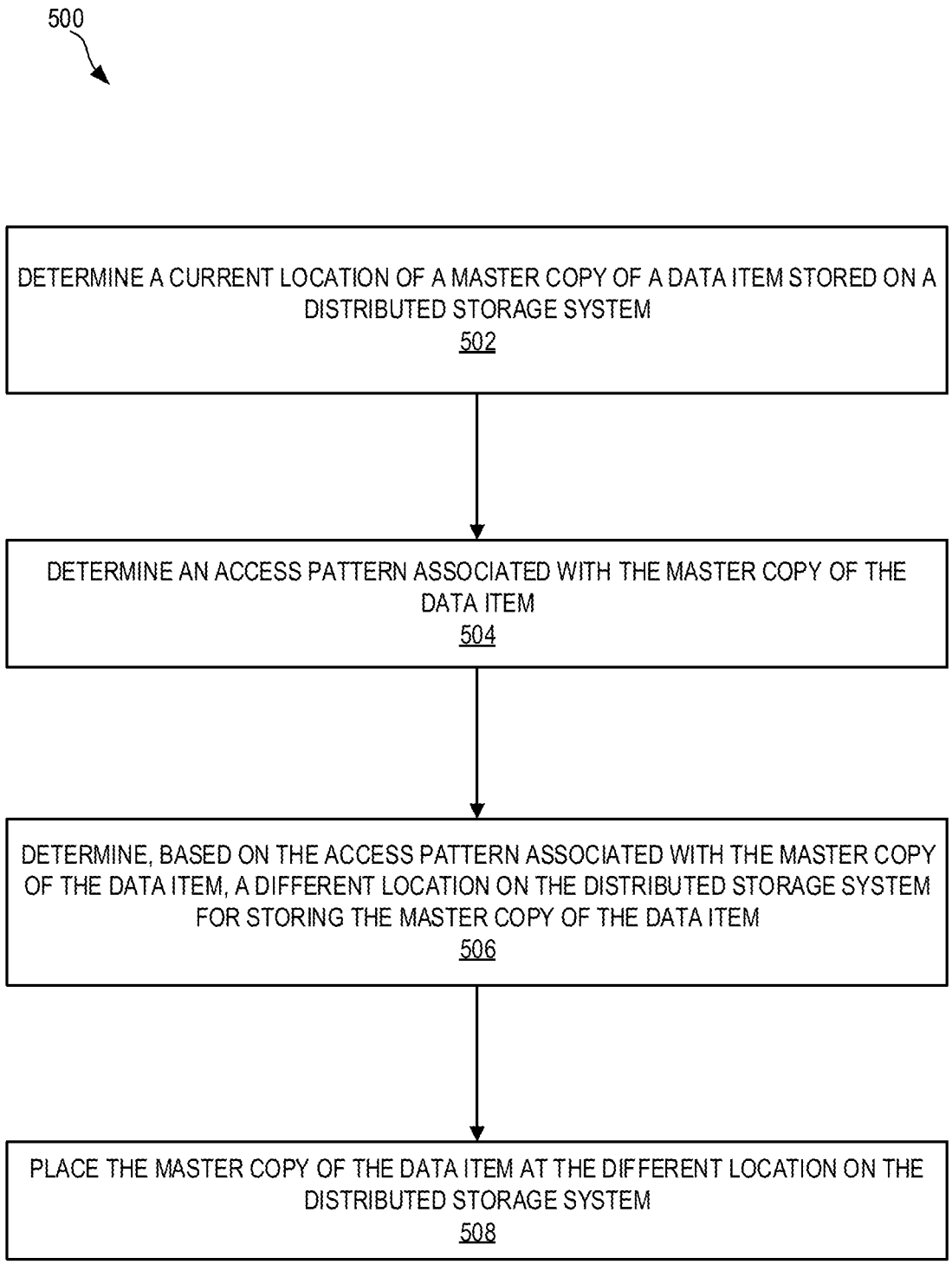
FIG. 5 illustrates an example method for managing a placement of data items on a distributed storage system, in accordance with some examples.
Figure 6:
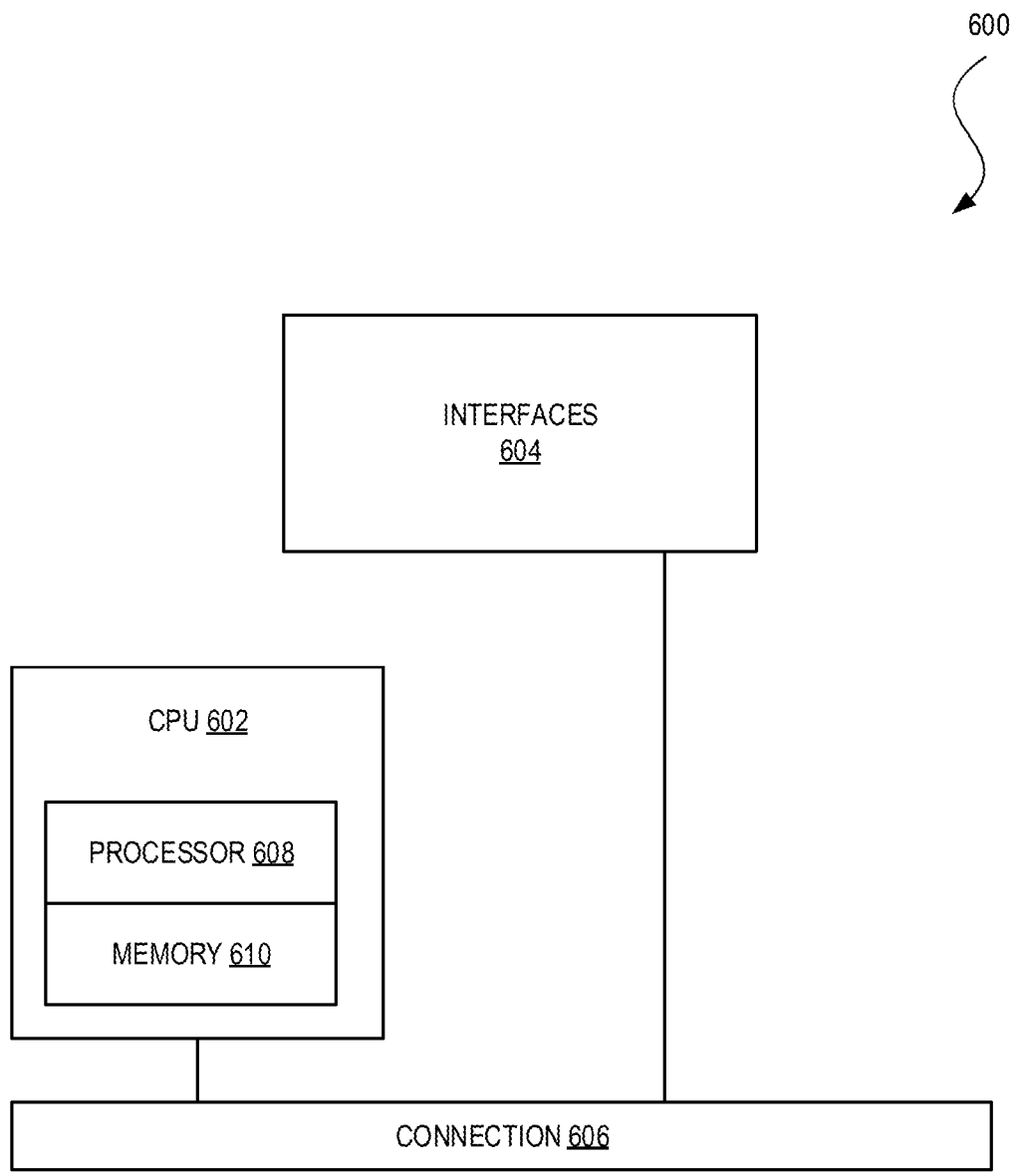
FIG. 6 illustrates an example network device in accordance with some examples.
Figure 7:
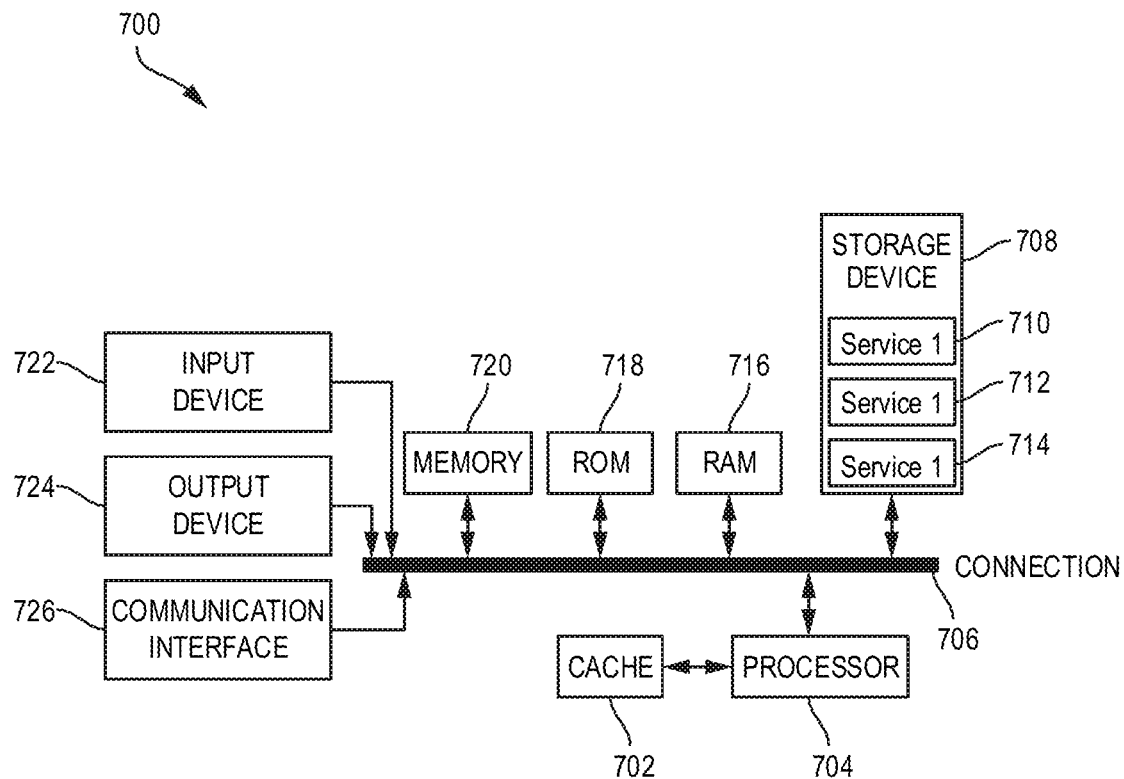
FIG. 7 illustrates an example computing device in accordance with some examples.

As further described below, the disclosed technology provides systems, methods, and computer-readable media for master data placement in distributed storage systems. The present technology will be described in the subsequent disclosure as follows. The discussion begins with a description of an example distributed storage system, as illustrated in FIG. 1, and a description of various examples and techniques for master data placement in a distributed storage system, as illustrated in FIGS. 2 through 4. A description of an example method for master data placement in distributed storage system, as illustrated in FIG. 5, will then follow. The discussion concludes with a description of an example network device, as illustrated in FIG. 6, and an example computing device architecture including example hardware components suitable for performing storage and computing operations, as illustrated in FIG. 7. The disclosure now turns to FIG. 1.

FIG. 1 is a simplified block diagram of an example distributed storage system 100, in accordance with some examples. In this example, the distributed storage system 100 includes a core 102 and edges 110A-N (collectively "110" hereinafter). The core 102 can serve as the backbone, centralized network and/or central hub for network and storage services provided by the distributed storage system 100. Moreover, the core 102 can include one or more networks such as, for example, a cloud network, a datacenter, etc., and/or one or more segments of a network environment of the distributed storage system 100, such as a core segment or hub.

The edges 110 can be connected to the core 102 via one or more network devices, such as, for example, one or more switches or routers and/or via one or more networks such as, for example, one or more public networks (e.g., wide-area networks, public clouds, etc.), one or more private networks (e.g., private datacenters, private clouds, local area networks, virtual private networks, etc.), and/or one or more hybrid networks (e.g., hybrid clouds, etc.). In some examples, the edges 110 can be interconnected with each other through the core 102 and/or directly (or without going through the core 102).

In some cases, the edges 110 can represent segments or sections of a network environment associated with the distributed storage system 100. For example, the edges 110 can be network segments or sections located on an edge or periphery of a network environment associated with the core 102 and/or the distributed storage system 100. In other cases, the edges 110 can represent separate networks such as, for example, fog networks, local area networks (LANs), on-premises datacenters, enterprise networks, etc. In some examples, such networks can be located on an edge or periphery of a network environment associated with the distributed storage system 100. Thus, the edges 110 can be physically and/or logically situated closer to one or more clients 160-166 than the core 102.

The core 102 can include one or more storage nodes 104 for storing or hosting one or more data stores 106. Similarly, the edges 110 can include storage nodes 112 for storing or hosting data stores 114-120. For example, edge 110A can include one or more storage nodes 112 for storing one or more data stores 114, edge 110B can include one or more storage nodes 112 for storing one or more data stores 116, edge 110C can include one or more storage nodes 112 for storing one or more data stores 118, and edge 110N can include one or more storage nodes 112 for storing one or more data stores 120.

The storage nodes 104 and 112 can represent hardware and/or virtual storage infrastructure on the distributed storage system 100. Moreover, the storage nodes 104 and 112 can include one or more physical storage servers, one or more virtual storage servers (e.g., virtual machines (VMs), software containers, etc.), one or more physical and/or logical storage components (e.g., storage drives, logical volumes, storage partitions, storage arrays, etc.), and/or any other physical and/or virtual/logical storage element. Each of the storage nodes 104 and 112 can be implemented by an individual storage element or can span or be distributed across multiple storage elements and provide a distributed storage infrastructure. In some cases, a storage node can span multiple physical or virtual storage elements. For example, a storage node can represent a virtual storage device, container, or location created from two or more physical servers and/or storage devices.

In some cases, the storage nodes 104 and 112 can be grouped into storage node pools or clusters. For example, the storage nodes 104 on the core 102 can be grouped into one or more storage node pools or clusters, and the storage nodes 112 on each of the edges 110 can be grouped into one or more storage node pools or clusters. Storage nodes can be grouped into storage node pools or clusters based on one or more factors, such as one or more common characteristics. For example, storage nodes can be grouped into storage node pools or clusters by storage type, type of data (e.g., the type of data they store), underlying storage platform, physical or virtual location, capacity, configuration settings or architecture, storage role, priorities, network segments (e.g., IP prefixes or subnets), shared resources, operating conditions, etc. In some cases, a pool or cluster of storage nodes (e.g., 104 and/or 112) can be configured to function as a single storage node or distributed storage. In other cases, a pool or cluster of storage nodes (e.g., 104 and/or 112) can represent a collection of storage nodes which can operate separately and/or individually.

The data stores 106 on the core 102 and the data stores 114-120 on the edges 110 can include storage repositories, containers or structures for persistently storing and managing master data items 108A-N and replica data items 130A-N. The data stores 106 on the core 102 and the data stores 114-120 on the edges 110 can include, for example, databases, files, file systems, storage systems, and/or any other data repositories. In some implementations, the data stores 106 and 114-120 can include one or more databases.

Each of the master data items 108A-N and replica data items 130A-N on the data stores 106 and 114-120 can include, for example, a record (e.g., a database record), one or more database fields, a data object, a data structure containing data or data values, a collection of data elements, a data value(s), a data partition, a content item, etc. In some examples, a data item (e.g., 108A-N and/or 130A-N) on the data stores 106 and/or 114-120 can include any type of self-contained (or largely self-contained) data item, such as a profile, a record, a table row, a set of data that does not reference other data items (or has limited references to other data items), etc.

The master data items 108A-N in the data stores 106 on the core 102 can represent master copies of the replica data items 130A-N, while the replica data items 130A-N in the data stores 114-120 on the edges 110 can represent replicas or read-only copies of the master data items 108A-N in the data stores 106 on the core 102. The master data items 108A-N can be read-write data items and can provide the source of truth (e.g., the current and/or authoritative data state and/or version) for the replica data items 130A-N. For example, master data item 108A can be a read-write data item and can provide the current and authoritative state or version of the data associated with the master data item 108A and the replica data item 130A, and master data item 108N can be a read-write data item and can provide the current and authoritative state or version of the data associated with the master data item 108N and replica data item 130N.

Clients 160-166 can access the master data items 108A-N and replica data items 130A-N through the distributed storage system 100. In particular, clients 160-166 can access the master data items 108A-N and replica data items 130A-N through the core 102 and/or the edges 110. For example, for read operations, clients 160-166 can access master data items 108A-N and/or replica data items 130A-N from the core 102 and/or the edges 110, and for write operations, clients 160-166 can access the master data items 108A-N (e.g., the master copies of the replica data items 130A-N) through the core 102. However, as further described below, master data items 108A-N can be moved or placed elsewhere on the distributed storage system 100 based on one or more factors. Thus, in some cases, clients 160-166 can access master data items 108A-N from one or more of the edges 110.

Clients 160-166 can represent any computing devices or networks. For example, in some cases, clients 160-166 can include one or more client endpoints (e.g., client computing devices such as personal computers, smartphones, tablet computers, smart televisions, gaming systems, set-top boxes, smart wearables, etc.), one or more servers, one or more Internet-of-Things (IoT) devices, one or more autonomous vehicles, one or more network devices (e.g., switches, routers, etc.), etc. In other cases, clients 160-166 can include one or more networks such as, for example, one or more LANs, one or more datacenters, one or more enterprise networks, one or more campus networks, one or more private networks, etc.

The distributed storage system 100 can include a coordinator system 140 that can collect and analyze information about the distributed storage system 100 and coordinate or orchestrate the placement or movement of master data items 108A-N and replica data items 130A-N on the distributed storage system 100. Moreover, the coordinator system 100 can include, or can be implemented by, one or more computing devices (physical and/or virtual). For example, in some cases, the coordinator system 100 can be implemented by a server, a network controller, an orchestrator appliance, a router, or any other computing device. In other cases, the coordinator system 100 can be implemented by multiple devices, such as multiple servers, multiple network controllers, multiple orchestrator appliances, multiple routers, etc.

In some examples, the coordinator system 140 can track and monitor statistics and information associated with the distributed storage system 100, the master data items 108A-N, and/or the replica data items 130A-N and move (or instruct the distributed storage system 100 to move) one or more of the master data items 108A-N and/or the replica data items 130A-N to a specific location(s) in the distributed storage system 100 based on the statistics and information tracked and monitored by the coordinator system 140.

To illustrate, if the statistics and information monitored by the coordinator system 140 indicate that master data item 108A is frequently accessed by client 160 from a location that is closest to edge 110A, the coordinator system 140 can trigger a move of the master data item 108A from the data stores 106 on the core 102 to the data stores 114 on the edge 110A. Such a move would reduce the distance (as well as the number of hops and/or potential number of bottlenecks) between the master data item 108A and the client 160, which frequently accesses the master data item 108A, and thus may decrease the latency and increase the access performance experienced by the client 160 when accessing the master data item 108A from the data stores 114 on the edge 110A—as opposed to accessing the master data item 108A from the data stores 106 on the core 102.

In some cases, the coordinator system 140 can use the collected information to coordinate or orchestrate the move of replica data items 130A-N on the distributed storage system 100. For example, when moving the master data item 108A from the data stores 106 on the core 102 to the data stores 114 on the edge 110A as described in the previous example, the coordinator system 140 can also move replica data item 130A on the data stores 114 of the edge 110A to the data stores 106 on the core 102. As another example, if the information collected and monitored by the coordinator system 140 indicates that replica data item 130A is frequently accessed by client 164 from a location that is closest to the core 102 or receives a faster response time from core 102 than edges 110, the coordinator system 140 can trigger a move of the replica data item 130A from one of the edges 110 to the core 102. As yet another example, if the information collected and monitored by the coordinator system 140 indicates that replica data item 130N is infrequently accessed from edge 110N, the coordinator system 140 can trigger a move of the replica data item 130N from edge 110N to the core 102 in order to reduce network and/or resource utilization at edge 110N (and thereby increase bandwidth, reduce congestion, and increase resource availability at edge 110N).

Moreover, in some cases, rather than moving a master data item from a current data store to a different, destination data store, the coordinator system 140 can instead designate a replica of the master data item (e.g., replica data item 130A or 130N) stored at the different, destination data store as the master data item, and designate the previous master data item at the current data store as a replica data item. In some examples, if the coordinator system 140 changes the designation of a replica data item to a master data item instead of moving the master data item to the location of the replica data item, the coordinator system 140 can perform a consistency check to ensure that the replica data item being designated as the master data item reflects the most current data or is not outdated and/or to check that designating the replica data item as a master data item does not create any conflicts or errors.

In some cases, if the coordinator system 140 determines that designating a replica data item as a master data item does create a conflict or error and/or that the replica data item does not reflect the most current data or is outdated, the coordinator system 140 can try to correct such conflict or error and/or update the replica data item to reflect the most current data prior to designating the replica data item as a master data item. In other cases, rather than trying to correct such conflict or error and/or update the replica data item to reflect the most current data, the coordinator system 140 can decide to not designate the replica data item as a master data item and instead decide to move the actual master data item to the location where the replica data item is stored. In such cases, the coordinator system 140 can leave the replica data item as a replica, and can either leave the replica data item at its current location or move the replica data item to a different location, such as the location where the master data item was moved from.

In some examples, the statistics and information tracked/monitored by the coordinator system 140 and used to trigger data placement actions can include access patterns and/or metrics associated with the master data items 108A-N, the replica data items 130A-N, the core 102, one or more of the edges 110, and/or one or more of the clients 160-166. In some cases, the coordinator system 140 can use such information to determine whether an access latency and/or access performance associated with a particular master data item and/or a particular replica data item can be improved by moving the master or replica data item to a different location (e.g., a different data store, storage node, segment, and/or network) in the distributed storage system 100. For example, the coordinator system 140 can use such information to determine whether moving a master or replica data item to a particular data store and/or location (e.g., core 102, edge 110A, edge 110B, edge 110C, or edge 110N) located closest to a client that has the most interactions or the most frequent interactions (e.g., read and/or write access operations or interactions) with that master or replica data item would improve the access statistics for that master or replica data item, such as the access delay or latency, the round trip time (RTT) for access requests/operations, the error rate, etc.

Non-limiting examples of access pattern information that can be used by the coordinator system 100 to determine/perform a data item move can include the locations (e.g., network addresses, physical locations, networks, geographic regions, storage nodes, data stores, etc.) from where data items (e.g., 108A-N and/or 130A-N) on the distributed storage system 100 have been accessed over a period of time and/or in general (e.g., the location of the clients 160-166 that have accessed the data items), an access frequency of the data items (e.g., 108A-N and/or 130A-N) from such locations (e.g., how many times and/or how often each data item has been accessed from each location and/or by each client at each location, etc.), which clients (e.g., 160-166) and/or how many clients have accessed the various data items (e.g., 108A-N and/or 130A-N), the type of access (e.g., read, write, etc.) from each access location and/or client, what other data items (if any) have been accessed in conjunction or association with a particular data item, what other operations have been performed in conjunction or association with access operations corresponding to the data items (e.g., 108A-N and/or 130A-N) and/or the access locations, the times and/or days that the data items (e.g., 108A-N and/or 130A-N) have been accessed from the access locations (and/or the relative frequency of access between the different times and/or days), the latency and/or other performance or access metrics observed for requests/operations from the access locations, routing information (e.g., number of hops, network path, routing cost, delay, performance, security, bandwidth, congestion, etc.) associated with access of the data items (e.g., 108A-N and/or 130A-N) and/or the access locations, and/or any other access pattern information.

In some cases, the information tracked/monitored by the coordinator system 140 and used to trigger data placement actions can include other types of information that can affect the state, security, stability, and/or performance of the distributed storage system 100 and/or the performance, cost and/or other metrics of access requests or operations received or processed by the distributed storage system 100. For example, the information can include the locations of the master data items 108A-N and replica data items 130A-N, the status/condition of one or more elements of the distributed storage system 100 (e.g., the core 102, the edges 110, the storage nodes 104 and 112, the data store 106, the data stores 114-120, etc.), the response times for access requests associated with the master data items 108A-N and/or replica data items 130A-N, the bandwidth available at the core 102 and/or one or more of the edges 110, resource usage and/or workload conditions at the core 102 and/or one or more of the edges 110, a resource availability and/or processing capacity at the core 102 and/or one or more of the edges 110, the location of the core 102 and/or edges 110, a topology of the core 102 and/or edges 110, performance metrics/statistics (e.g., input/output operations per second (IOPS), latency, bandwidth, throughput, packet loss, jitter, connectivity, retransmission, error rate, RTT, congestion, availability, utilization, etc.) associated with the core 102 and/or edges 110, client subscription levels (e.g., premium access, standard or basic access, guest access, etc.) associated with the clients 160-166, etc.

In some cases, the coordinator system 100 can use the information collected from/for the distributed storage system 100 to determine a data item placement scheme or action for placing or distributing one or more of the master data items 108A-N and/or replica data items 130A-N at specific locations (e.g., data stores, storage nodes, segments, networks, etc.) on the distributed storage system 100. For example, the coordinator system 100 can use such information to determine a data item placement scheme estimated to better balance or distribute the load or burden on the distributed storage system 100, improve the access performance for the master data items 108A-N and/or replica data items 130A-N, reduce error rates, satisfy certain access criteria (e.g., access performance levels, quality-of-service (QoS) requirements, service level agreements (SLAs), security requirements, access restrictions, etc.), satisfy data sovereignty laws/policies, increase resource availability, decrease resource overutilization, reduce congestion, reduce costs, improve bandwidth, increase efficiency, reduce network traffic, etc.

To illustrate, the coordinator system 100 can use the information to determine the sources and locations of write requests associated with the master data items 108A-N and the respective frequency of the write requests from each of the locations to identify a target location for moving or placing one or more of the master data items 108A-N. The target location can be, for example, a location (e.g., an edge, the core, a data store, a storage node, etc.) on the distributed storage system 100 that is closest to the location where the most frequent write requests originate. Moving or placing one or more of the master data items 108A-N at such location can reduce the distance traversed by the write requests for such master data item(s) originating from that location (which is the most frequent access location and thus accounts for a significant portion of the write requests for such master data item(s)) to the location on the distributed storage system 100 where such master data item(s) are stored. This can help reduce the latency and improve the performance of write requests for such master data item(s) from that particular location.

The coordinator system 140 can receive the information (e.g., data item access histories and/or statistics, operating conditions at the various locations on the distributed storage system 100, data item information, topology information associated with the distributed storage system 100, performance metrics, storage or placement information, resource parameters, request parameters, configuration information, etc.) collected and monitored/tracked by the coordinator system 140 from the distributed storage system 100 (e.g., the core 102, the edges 110, one or more network devices on the distributed storage system 100, etc.) on a push and/or pull basis. For example, the coordinator system 140 can pull, from the distributed storage system 100, a respective stream of data, such as access patterns, statistics, metrics, status information, operating conditions, etc. As another example, the distributed storage system 100 can push to the coordinator system 140 such respective stream of data.

The elements and components shown in FIG. 1 are illustrative examples provided for explanation purposes. Thus, while FIG. 1 illustrates a certain type and number of networks or segments (e.g., core 102, edges 110A through 110N) and components (e.g., storage nodes 104 and 112, data stores 106 and 114-120, master data items 108A-N, replica data items 130A-N, etc.), one of ordinary skill in the art will recognize that other examples may include a different number and/or type of networks/segments and/or components than those shown in FIG. 1. For example, in some cases, the distributed storage system 100 can include more or less edges, cores or core segments, and/or components (e.g., storage nodes 104 and 112, data stores 106 and 114-120, master data items 108A-N, replica data items 130A-N, devices, etc.) than those shown in FIG. 1.

FIG. 2 illustrates an example data item placement scenario 200 in the distributed storage system 100. In this example, client 160 is located closer/closest to edge 110A, client 162 is located closer/closest to edge 110B, client 164 is located closer/closest to edge 110C, and client 166 is located closer/closest to edge 110N. Moreover, the coordinator system 140 can receive and monitor placement data 202 from the distributed storage system 100.

The placement data 202 can include metrics, statistics, events data, status information, state information, notifications, configuration information, job/workload information, information about data items, access pattern information, parameters, preferences, client information, information about access and/or data restrictions, location information, resource information, network information, etc. In some examples, the placement data 202 can include a history of access requests and/or operations (e.g., access patterns)

associated with master data items 108A-N and replica data items 130A-N. The history of access requests and/or operations can indicate one or more access patterns associated with the master data items 108A-N and the replica data items 130A-N, such as which clients 160-166 have accessed the master data items 108A-N and the replica data items 130A-N, the locations of the access requests and/or operations (e.g., the location of the clients 160-166 associated with the access requests and/or operations) associated with the master data items 108A-N and the replica data items 130A-N, the frequency of access requests and/or operations from the locations associated with the access requests and/or operations, the type of access requests and/or operations (e.g., read, write, etc.), the day/time of such access requests and/or operations, performance statistics associated with the access requests and/or operations, access anomalies, access trends, etc.

For example, the placement data 202 can indicate that the client 160 is closest to the edge 110A (relative to edges 110B-N and core 102), the client 162 is closest to the edge 110B (relative to edge 110A, edges 110C-N and core 102), the client 164 is closest to the edge 110C (relative to edges 110A-B, edge 110N and core 102), and the client 166 is closest to the edge 110N (relative to edges 110A-C and core 102). The placement data 202 can also indicate that the client 162 has accessed master data item 108A on the data stores 106 of the core 102 more frequently and/or a greater number of times than clients 160 and 164-166, and that client 166 has accessed master data item 108N on the data stores 106 of the core 102 more frequently and/or a greater number of times than clients 160-164. As further explained below, the coordinator system 140 can use this information in the placement data 202 to move the master data items 108A and 108N closer to clients 162 and 166 respectively, and thereby reduce the latency and improve the performance of access requests and operations for the master data items 108A and 108N from the clients 162 and 166.

In some examples, the placement data 202 can include information (e.g., performance statistics, bandwidth, congestion, capacity, delays, resource availability, a state, a condition, metrics, location information, configuration information, access restrictions, access policies, etc.) about the core 102, the edges 110, and/or components of the core 102 and/or the edges 110 such as, for example, the storage nodes 104 and 112, the data store 106 on the core 102, the data stores 114-120 on the edges 110, the master data items 108A-N and replica data items 130A-N, etc.

The coordinator system 140 can analyze the placement data 202 and determine whether any of the master data items 108A-N and/or replica data items 130A-N should be moved (e.g., whether moving such data items would yield one or more improvements/benefits) based on the access patterns of the clients 160-166 and/or any other information associated with the distributed storage system 100. In other words, the coordinator system 140 can analyze the placement data 202 and determine whether moving any of the master data items 108A-N and/or the replica data items 130A-N to a different storage location would reduce a latency of future access requests/operations, improve a performance of future access requests/operations, reduce a load/burden on the distributed storage system 100, improve resource utilization at the distributed storage system 100, reduce congestion, optimize bandwidth usage/availability, improve resource availability at the distributed storage system 100, and/or provide any other benefits for data access requests/operations and/or network/system conditions.

For example, as previously noted, the placement data 202 can indicate that the master data item 108A on the core 102 has been most frequently accessed by the client 162 (relative to the clients 160 and 164-166). Accordingly, to improve the access performance and efficiency for future requests by the client 162 to access master data item 108A and by the client 166 to access master data item 108N, the coordinator system 140 can move the master data item 108A and the master data item 108N to locations that are closer to client 162 and client 166, and thereby reduce the latency and increase the performance of future access requests from clients 162 and 166 for the master data items 108A and 108N.

Thus, in some examples, after determining (e.g., based on the placement data 202) that the master data item 108A on the core 102 is most frequently accessed by the client 162 and that the client 162 is closer/closest to edge 110B than the other storage locations on the distributed storage system 100 (e.g., core 102 and edges 110A, 110C, and 110N), the coordinator system 140 can decide to move the master data item 108A from the core 102 (e.g., from the data stores 106) to the edge 110B (e.g., to the data stores 116) to improve the performance and reduce the latency of requests/operations from the client 162 for the master data item 108A.

Similarly, after determining (e.g., based on the placement data 202) that the master data item 108N on the core 102 is most frequently accessed by the client 166 and that the client 166 is closer/closest to edge 110N than the other storage locations on the distributed storage system 100 (e.g., core 102 and edges 110A, 110B, and 110C), the coordinator system 140 can decide to move the master data item 108N from the core 102 (e.g., from the data stores 106) to the edge 110N (e.g., to the data stores 120) to improve the performance and reduce the latency of requests/operations from the client 166 for the master data item 108N.

To move data items or trigger placement actions, the coordinator system 140 can send a placement request 204 to the distributed storage system 100 (e.g., to the core 102, the edge 110A, the edge 110B, the edge 110C, the edge 110N, and/or a network device in the distributed storage system 100). For example, the coordinator system 140 can send the placement request 204 to the core 102, which can trigger a move of the master data item 108A to the edge 110B and a move of the master data item 108N to the edge 110N. The placement request 204 can include, for example, a command, instruction, and/or request to move the master data item 108A to the edge 110B and the master data item 108N to the edge 110N.

The distributed storage system 100 can receive (e.g., at the core 102) the placement request 204 from the coordinator system 140, and perform data placement actions 206 and 208 as requested in, or triggered by, the placement request 204. In some examples, the data placement action 206 can be a move of the master data item 108A from the core 102 to the edge 110B so the master data item 108A is stored closer to the client 162 that most frequently accesses the master data item 108A. Similarly, in some examples, the data placement action 208 can be a move of the master data item 108N from the core 102 to the edge 110N so the master data item 108N is stored closer to the client 166 that most frequently accesses the master data item 108N.

After the data placement actions 206 and 208, the master data item 108A will be hosted by (e.g., stored on) the edge 110B, as opposed to the core 102, and the master data item 108N will be hosted by (e.g., stored on) the edge 110N, as opposed to the core 102. Thus, on future instances, the client 162 will be able to access the master data item 108A from a corresponding one of the data stores 116 at the edge 110B, and the client 166 will be able to access the master data item 108N from a corresponding one of the data stores 120 at the edge 110N. By placing the master data item 108A on the edge 110B, the coordinator system 140 can reduce the distance between the client 162 and the master data item 108A and thereby reduce the latency and increase the performance of future access requests and operations by client 162 for the master data item 108A. In addition, by placing the master data item 108N on the edge 110 N, the coordinator system 140 can reduce the distance between the client 166 and the master data item 108 N and thereby reduce the latency and increase the performance of future access requests and operations by client 166 for the master data item 108 N.

The coordinator system 140 can continue to receive and monitor placement data 202 to determine whether additional data placement actions should be performed. For example, if new placement data indicates that client 160 is now the client that most frequently accesses (reads and/or writes) the master data item 108A previously moved to the edge 110B, the coordinator system 140 can send a new placement request to the distributed storage system 100 to trigger a move of the master data item 108A from the edge 110B to the edge 110A that is closer to the client 160.

While the data placement actions 206 and 208 were described in the examples above as involving moving the master data items 108A and 108N to the locations (e.g., the edges 110B and 110N and the data stores 116 and 120) closest to the clients 162 and 166 that most frequently access the master data items 108A and 108N, it should be noted that, in other examples, the data placement actions 206 and 208 can move the master data items 108A and 108N to other locations (e.g., other data stores and/or edges, the core, etc.) and/or based on other factors and/or access patterns.

For example, in some cases, a master data item (e.g., 108A, 108B, or 108N) can be moved to or from a particular location (e.g., data store 106, 114, 116, 118, or 120; the core 102; edge 110A, 110B, 110C, or edge 110N; etc.) based on one or more conditions (e.g., bandwidth, resource availability, congestion, connectivity or downtime, error rates, state, performance, access restrictions, etc.) at a source and/or destination location (e.g., data store, core, edge, etc.), one or more characteristics (e.g., location, platform or infrastructure, configuration, performance statistics, relative rankings, network type, data type, type of resources, etc.) of the source and/or destination location, one or more events (e.g., traffic fluctuations, one or more network or resource failures, one or more errors, one or more network changes, etc.), one or more preferences or requirements (e.g., one or more QoS requirements, SLAs, client preferences, data or job requirements, restrictions, etc.), costs and/or client subscription levels, other access patterns (e.g., read and/or write access patterns associated with a group of data items, clients, and/or locatins), and/or any other factors or combination of factors.

FIG. 3 illustrates an example group data item placement scenario 300 in the distributed storage system 100. The coordinator system 140 can receive and monitor placement data 202 from the distributed storage system 100, as previously explained. In this example, the placement data 202 can include access patterns associated with partitioned data 304. The partitioned data 304 can include the master data items 108A-N. For example, each of the master data items 108A-N can represent a partition of a partitioned data set (e.g., 304), and together the master data items 108A-N can make up the partitioned data 304. Thus, in this example, the placement data 202 can provide access patterns for different data partitions (e.g., 108A-N) in a partitioned data set (e.g., 304).

In some cases, the placement data 202 can include statistics identifying the respective locations of clients accessing the partitioned data 304 and/or each individual partition (e.g., master data items 108A-N) in the partitioned data 304, as well as the respective access frequency by such clients. In some examples, the placement data 202 can also include statistics identifying access patterns for other data items, such as replica data items 130A-N. The coordinator system 140 can thus analyze the placement data 202 and determine that the partitioned data 304 is most frequently accessed by the clients 160 and 162. In some cases, the coordinator system 140 can also determine (e.g., based on the placement data 202) that client 160 is located closest to edge 110A and client 162 is located closest to edge 110B. The coordinator system 140 can also determine that, even though client 160 is closest to edge 110A, edge 110B is closer to client 160 than core 102 (and edges 110C and 110N).

Based on this information, the coordinator system 140 can determine that moving the partitioned data 304, including the master data items 108A-N, to the edge 110B may provide the biggest boost and/or advantages (and/or balance of advantages and disadvantages) in performance and/or cost for access requests/operations associated with the partitioned data 304 as a whole and/or one or more of its constituent parts (e.g., master data items 108A-N). Accordingly, after determining that moving the partitioned data 304 to the edge 110B may provide the biggest boost and/or advantages (and/or the optimal balance of advantages and disadvantages) in performance and/or cost for access requests/operations associated with the partitioned data 304, the coordinator system 140 can send a group placement request 302 to the distributed storage system 100 (e.g., to the core 102, the edge 110B, and/or a network device in the distributed storage system 100).

The group placement request 302 can include an instruction to move the partitioned data 304, including the master data items 108A-N, to the edge 110B. The instruction can then trigger the group placement action 304, which can include moving the partitioned data 304, including the master data items 108A-N, to the edge 110B (e.g., to one or more of the data stores 116 on the edge 110B). After the group placement action 304, the partitioned data 304 will be hosted by (e.g., stored on) the edge 110B as opposed to the core 102. Thus, in the future, the clients 160 and 162 (and any other clients) will be able to access the partitioned data 304 (and/or any of the master data items 108A-N in the partitioned data 304) from the edge 110B, which is closer to the clients 160 and 162 than the core 102 and can therefore yield access performance improvements/benefits (e.g., reduced latency), cost improvements/benefits and/or other improvements/benefits. For example, by placing the partitioned data 304 on the edge 110B, the coordinator system 140 can reduce the distance between the clients 160 and 162 and the partitioned data 304 and thereby reduce the latency and increase the performance of future access requests and operations by clients 160 and 162 for the partitioned data 304.

The coordinator system 140 can continue to receive and monitor placement data 202 to determine whether additional placement actions should be performed. For example, if new placement data indicates that clients 164 and/or 166 have accessed the partitioned data 304 with a greater frequency than clients 160 and/or 162 for a configurable amount of time, the coordinator system 140 can determine whether the partitioned data 304 should be moved to a different location. To illustrate, if the coordinator system 140 determines that the clients 164 and 166 are located closer to edge 110C than to edge 110B, the coordinator system 140 can estimate whether moving the partitioned data 304 from edge 110B to edge 110C would yield performance or other (e.g., cost, resource availability, congestion/bandwidth, etc.) improvements (overall and/or in balance).

The coordinator system 140 can estimate whether moving the partitioned data 304 from edge 110B to edge 110C would yield such improvements based on one or more factors. For example, in some cases, the coordinator system 140 can estimate whether moving the partitioned data 304 from edge 110B to edge 110C would yield such improvements based on the relative distances of clients 160-166 to edges 110B and 110C, the frequency (and/or differences in frequency) in which clients 160-166 access the partitioned data 304, the days/times in which clients 160-166 access the partitioned data 304, bandwidth and/or congestion metrics associated with the clients 160-166 and/or the edges 110B and 110C, QoS requirements and/or SLAs associated with the clients 160-166, and/or any other relevant factors.

As previously mentioned, in the example shown in FIG. 3, client 160 is closest to edge 110A and client 162 is closest to edge 110B, and the partitioned data 304 was moved to edge 110B based on the access frequencies of clients 160 and 162 despite client 160 being located closer to edge 110A. Here, the coordinator system 140 can determine that moving the partitioned data 304 to edge 110B would provide a bigger advantage/benefit (overall and/or in balance), such as a bigger performance boost, than moving the partitioned data 304 to edge 110A. For example, the coordinator system 140 can compare the advantages and disadvantages of moving the partitioned data 304 to edge 110A and edge 110B, and select edge 110B as the target location of the partitioned data 304 based on the comparison of advantages and disadvantages. The coordinator system 140 can determine the advantages and disadvantages based on, for example, the relative distances of clients 160 and 162 to edges 110A and 110B, the relative frequency in which clients 160 and 162 access the partitioned data 304, the type of operations (e.g., read and/or write) performed by the clients 160 and 162 on the partitioned data 304, bandwidth and/or congestion metrics associated with the clients 160 and 162 and/or the edges 110A and 110B, QoS requirements and/or SLAs associated with the clients 160 and 162, and/or any other relevant factors.

FIG. 4 illustrates another example group data item placement scenario 400 in the distributed storage system 100. As previously explained, the coordinator system 140 can receive and monitor placement data 202 from the distributed storage system 100. In this example, the placement data 202 can include access patterns associated with groups of data items, such as groups of data items from the master data items 108A-N and replica data items 130A-N. For example, the placement data 202 can include statistics identifying one or more groups of data items that are frequently accessed together, as well as the respective locations of clients accessing the one or more groups of data items and the respective access frequency by such clients.

To illustrate, the placement data 202 can indicate that master data items 108A and 108N are frequently accessed together by client 162 for write operations, and that client 162 is located closer to the edge 110B than the core 102 and the edges 110A, 110C, and 110N. The placement data 202 can indicate that client 162 accesses the master data items 108A and 108N (e.g., together and/or individually) more frequently than clients 160, 164, and 166 (e.g., together and/or individually). Based on this information, the coordinator system 140 can determine that moving the master data items 108A and 108N to the edge 110B would provide a greater performance and/or other benefit/improvement (overall and/or in balance) than leaving the master data items 108A and 108N at their respective locations (e.g., core 102 and edge 110N) or moving the master data items 108A and 108N to a different location in the distributed storage system 100.

Accordingly, after determining that moving the master data items 108A and 108N to the edge 110B may provide a bigger boost and/or benefit/advantage (and/or the optimal balance of advantages and disadvantages) in performance and/or aspects for access requests/operations associated with the master data items 108A and 108N, the coordinator system 140 can send a group placement request 402 to the distributed storage system 100 (e.g., to the core 102, the edge 110B, the edge 110N, and/or a network device in the distributed storage system 100).

The group placement request 402 can include an instruction to move the master data items 108A and 108N to the edge 110B. The instruction can trigger the group placement action 404, which can include moving the master data items 108A and 108N from the core 102 to the edge 110B (e.g., to one or more of the data stores 116 on the edge 110B). After the group placement action 404, the master data item 108A will be hosted by (e.g., stored on) the edge 110B, as opposed to the core 102, and the master data item 108N will be hosted by (e.g., stored on) the edge 110B as opposed to the edge 110N. Thus, in the future, the client 162 (and any other clients) will be able to access the master data items 108A and 108N from the edge 110B, which is closest to the client 162 and can therefore yield access performance improvements/benefits (e.g., reduced latency), cost improvements/benefits and/or other improvements/benefits. For example, by placing the master data items 108A and 108N on the edge 110B, the coordinator system 140 can reduce the distance between the client 162 and the master data items 108A and 108N and thereby reduce the latency and increase the performance of future access requests and operations by client 162 for the master data items 108A and 108N. Overall and/or on balance, such improvements/benefits can be estimated to be greater than any disadvantages of moving the master data items 108A and 108N to the edge 110B, such as any decrease in performance for access requests/operations from clients 160, 164, and/or 166.

The coordinator system 140 can continue to receive and monitor placement data 202 to determine whether additional placement actions should be performed. If new placement data indicates that other client(s) located closer to a different location of the distributed storage system 100 have accessed the master data items 108A and/or 108N with a greater frequency than client 162 for a configurable amount of time, the coordinator system 140 can determine whether the master data items 108A and/or 108N should be moved to the different location, as previously described.

Having disclosed example systems, components and concepts, the disclosure now turns to the example method 500 for managing a placement of data items (e.g., 108A-N, 130A-N) on a distributed storage system (e.g., 100), as shown in FIG. 5. The steps outlined herein are non-limiting examples provided for illustration purposes, and can be implemented in any combination thereof, including combinations that exclude, add, or modify certain steps.

At step 502, the method 500 can include determining a current location (e.g., core 102; edge 110A, 110B, 110C, or 110N; data stores 106, 114, 116, 118, or 120) of a master copy of a data item (e.g., master data item 108A, 108B, or 108N) stored on a distributed storage system (e.g., 100). In some examples, the current location of the master copy of the data item can include a current network or network segment (e.g., core 102, edge 110A, edge 110B, edge 110C, or edge 110N) on the distributed storage system and/or a current data store (e.g., data store 106, 114, 116, 118, or 120) from a plurality of data stores (e.g., data stores 106 and 114-120) on the distributed storage system.

At step 504, the method 500 can include determining an access pattern associated with the master copy of the data item. In some cases, the access pattern associated with the master copy of the data item can include one or more originating locations of a set of access requests (e.g., read and/or write requests) received by the distributed storage system for the master copy of the data item, a number of access requests received from each of the one or more originating locations, types of access requests (e.g., read, write, etc.), days/times of access requests, data access trends (e.g., time-based data access trends, client-based data access trends, location-based access trends, access trends associated with specific data items or types, access trends associated with specific access triggers, access trends associated with specific groups of data items, data access sequences, access trends associated with specific events, access trends associated with specific conditions, etc.), and/or any other access patterns characteristics.

In some examples, the access pattern associated with the master copy of the data item includes one or more originating locations of a set of access requests (e.g., read and/or write requests) received by the distributed storage system for the master copy of the data item and a number of access requests received from each of the one or more originating locations. The one or more originating locations can refer to the locations (e.g., networks, clients, addresses, geographic locations, regions, sources, etc.) from where the set of access requests originate (e.g., where the access requests are generated, transmitted, etc.). The number of access requests can refer to the quantity and/or frequency of access requests. For example, the number of access requests received from an originating location can refer to how many access requests originate from that location and/or a frequency in which access requests are received from that location.

In some cases, the access pattern associated with the master copy of the data item can be determined based on placement data (e.g., 202) collected and/or monitored from the distributed storage system. For example, in some cases, a coordinator system (e.g., 140) can collect, from the distributed storage system, information such as access pattern statistics (e.g., data access requests or operations, number and/or frequency of data access requests or operations, the location of clients associated with the data access requests or operations, the location of data items accessed by such clients from such locations, the distance between the location of such data items and the location of such clients, days/times of such data access requests or operations, etc.), network statistics, resource statistics, data access restrictions, data access subscription levels, network and/or distributed storage system characteristics, system events, errors, failures, metrics, data item characteristics, client and/or data preferences, data types, network or system configuration information, data access policies, etc.

At step 506, the method 500 can include determining, based on the access pattern associated with the master copy of the data item, a different location (e.g., a different one of the core 102; the edge 110A, 110B, 110C, or 110N; the data stores 106, 114, 116, 118, or 120) on the distributed storage system for storing the master copy of the data item. In some examples, the different location can include a different network or network segment (e.g., core 102, edge 110A, edge 110B, edge 110C, or edge 110N) on the distributed storage system and/or a different data store from the plurality of data stores.

In some aspects, determining the different location on the distributed storage system for storing the master copy of the data item can include, based on the access pattern associated with the master copy of the data item, identifying, from the one or more originating locations, an originating location of a highest number of access requests associated with the master copy of the data item; determining which of the plurality of data stores is located closest (e.g., geographically closest, logically closest, etc.) to the originating location of the highest number of access requests associated with the master copy of the data item; and determining that the different data store associated with the different location is located closest to the originating location of the highest number of access requests associated with the master copy of the data item.

The originating location of the highest number of access requests can refer to the location that originated the highest amount and/or frequency of access requests for the master copy of the data item and/or the location from which the highest amount and/or frequency of access requests for the master copy of the data item were received by the distributed storage system. In some examples, the one or more originating locations can correspond to one or more client devices (e.g., 160, 162, 164, 166) that generated the set of access requests received by the distributed storage system for the master copy of the data item In some examples, determining that the different data store is located closest to the originating location of the highest number of access requests associated with the master copy of the data item can include determining that a number of hops between the different data store (e.g., associated with the different location) and the originating location is less than a respective number of hops between each of the plurality of data stores and each of one or more remaining locations from the one or more originating locations (e.g., the one or more originating locations excluding the originating location of the highest number of access requests), and/or determining that a distance between the different data store and the originating location is less than a respective distance between each of the plurality of data stores and each of the one or more remaining locations from the one or more originating locations.

In other examples, determining that the different data store is located closest to the originating location of the highest number of access requests associated with the master copy of the data item can instead or additionally include determining that a number of hops between the different data store and the originating location is less than a respective number of hops between each of a plurality of networks or networks segments (e.g., core 102, edges 110) associated with the distributed storage system and each of one or more remaining locations from the one or more originating locations, and/or determining that a distance between the different data store and the originating location is less than a respective distance between each of the plurality of networks or networks segments (e.g., core 102, edges 110) associated with the distributed storage system and each of the one or more remaining locations from the one or more originating locations.

In some aspects, determining the different location on the distributed storage system for storing the master copy of the data item can include determining a second current location of a second master copy of a second data item (e.g., master data item 108A, 108B, or 108N) stored on the distributed storage system; selecting, based on the access pattern associated with the master copy of the data item and a second access pattern associated with the second master copy of the second data item, the different location on the distributed storage system for storing both the master copy of the data item and the second master copy of the second data item; and placing both the master copy of the data item and the second master copy of the second data item at the different location on the distributed storage system. In some examples, the second current location of the second master copy of the second data item can include a second current data store from the plurality of data stores on the distributed storage system. Moreover, in some examples, the master copy of the data item can include a first partition of a partitioned data set (e.g., partitioned data 304) and the second master copy of the second data item can include a second partition of the partitioned data set.

In some cases, the second access pattern can include one or more respective originating locations of a second set of access requests associated with the second master copy of the second data item (e.g., the locations from where the second set of access requests originated or where received) and a second respective number of access requests (e.g., an amount and/or frequency of access requests) received from each of the one or more respective originating locations. In some examples, placing both the master copy of the data item and the second master copy of the second data item at the different location on the distributed storage system can include moving or migrating the master copy of the data item from the current location to the different location and moving or migrating the second master copy of the second data item from the second current location to the different location.

At step 508, the method 500 can include placing the master copy of the data item at the different location on the distributed storage system. In some examples, placing the master copy of the data item at the different location on the distributed storage system can include moving or migrating the master copy of the data item from the current data store to the different data store.

In some aspects, the method 500 can include determining that the master copy of the data item and a second data item on the distributed storage system have been accessed together a threshold number and/or frequency of times; and after determining the different location on the distributed storage system for storing the master copy of the data item, moving the second data item from a current respective location of the second data item to the different location. The current respective location can include, for example, a data store from the plurality of data stores on the distributed storage system.

In some aspects, the method 500 can include determining that the master copy of the data item includes a reference (e.g., a pointer, an association, a link, a relation, etc.) to a particular copy of a second data item stored on the distributed storage system; in response to determining the different location on the distributed storage system for storing the master copy of the data item and determining that the master copy of the data item includes the reference to the particular copy of the second data item, selecting the different location on the distributed storage system for storing the particular copy of the second data item; and moving the particular copy of the second data item from a respective location on the distributed storage system to the different location on the distributed storage system. In some examples, the particular copy of the second data item can include a master copy of the second data item or a replica of the master copy of the second data item.

In some implementations, the method 500 can determine the different location for placing (e.g., moving, migrating, storing, etc.) a data item based on access pattern information and/or one or more other factors. For example, in some aspects, the method 500 can include collecting information associated with the distributed storage system; based on the information associated with the distributed storage system, determining a data placement action estimated to improve a data access performance (e.g., latency, response time, error rate, etc.) associated with one or more data items on the distributed storage system and/or improve a performance of the distributed storage system (e.g., the performance of the distributed storage system as a whole and/or one or more components/resources of the distributed storage system); and in response to determining the data placement action, moving at least one data item (e.g., master data items 108A, 108B, and/or 108N; and/or replica data items 130A and/or 130N) from at least one storage location (e.g., a data store, core 102, edge 110A, edge 110B, edge 110C, or edge 110N) to at least one different storage location (e.g., a different data store, core 102, edge 110A, edge 110B, edge 110C, or edge 110N).

In some examples, the collected information associated with the distributed storage system can include statistics associated with one or more resources (e.g., storage nodes 104 and/or 112, compute nodes, core 102, edges 110, network devices, bandwidth, etc.), one or more data access restrictions (e.g., location-based restrictions, policy-based restrictions, client-based restrictions, network-based restrictions, resource-based restrictions, source-based restrictions, data type-based restrictions, subscription-based restrictions, etc.) associated with one or more data items on the distributed storage system, data storage restrictions (e.g., restrictions based on data sovereignty laws, data types, resource types, network utilization, resource utilization, day/time, resource availability, etc.), one or more events (e.g., errors, failures, network changes, traffic changes, access events, system events, etc.), data access patterns, and/or network statistics associated with the distributed storage system and/or one or more networks associated with the distributed storage system. In some examples, the one or more resources can include a storage node, a compute node, a virtual machine, a software container, a server, a network, and/or a networking device (e.g., a switch, a router, a firewall, an appliance, etc.).

In some cases, the data placement action can include moving at least one data item from at least one storage location (e.g., a data store, core 102, edge 110A, edge 110B, edge 110C, or edge 110N) to at least one different storage location. In some examples, the at least one storage location and the at least one different storage location can include different data stores from the plurality of data stores, different networks associated with the distributed storage system, different network segments, etc.

In some examples, when determining a data placement action (e.g., moving or migrating a data item) based multiple more factors (e.g., access patterns, performance statistics, resource metrics, environment conditions, events, etc.), the factors used to determine the data placement action can be weighed. For example, assume that a data placement action for a data item is determined based on a frequency of access of the data item from different access locations, a status of different storage nodes on the distributed storage system, and an amount of bandwidth available at different networks or segments of the distributed storage system. Here, different weights can be determined for, and applied to, the frequency of access, the status of the different storage nodes, and the amount of bandwidth available used to determine the placement action. This will allow the various factors to be taken into account for the placement action with certain factors receiving higher weight, emphasis, or priority.

The disclosure now turns to FIGS. 6 and 7, which illustrate example network devices and computing devices, such as switches, routers, nodes, servers, client devices, orchestrators (e.g., coordinator system 140), and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates an example computing system architecture of a system 700 which can be used to process data operations and requests, store and move data items, coordinate data placement actions, and perform other computing operations. In this example, the components of the system 700 are in electrical communication with each other using a connection 706, such as a bus. The system 700 includes a processing unit (CPU or processor) 704 and a connection 706 that couples various system components including a memory 720, such as read only memory (ROM) 718 and random access memory (RAM) 716, to the processor 704. The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    determining a current location of a master copy of a data item stored on a distributed storage system, wherein the current location of the master copy of the data item comprises a current data store from a plurality of data stores on the distributed storage system;
    determining an access pattern associated with the master copy of the data item, the access pattern comprising one or more originating locations of a set of access requests received by the distributed storage system for the master copy of the data item and a respective number of access requests received from each of the one or more originating locations;
    determining, based on the access pattern associated with the master copy of the data item, a different location on the distributed storage system for storing the master copy of the data item, the different location comprising a different data store from the plurality of data stores; and
    placing the master copy of the data item at the different location on the distributed storage system;
    wherein determining the different location on the distributed storage system for storing the master copy of the data item comprises:
        based on the access pattern associated with the master copy of the data item, identifying, from the one or more originating locations, an originating location of a highest number of access requests associated with the master copy of the data item;
        determining which of the plurality of data stores is located closest to the originating location of the highest number of access requests associated with the master copy of the data item; and
        determining that the different data store associated with the different location is located closest to the originating location of the highest number of access requests associated with the master copy of the data item.

2. The method of claim 1, wherein the one or more originating locations correspond to one or more client devices that generated the set of access requests received by the distributed storage system for the master copy of the data item, and wherein placing the master copy of the data item at the different location on the distributed storage system comprises moving the master copy of the data item from the current data store to the different data store.

3. The method of claim 1, wherein determining that the different data store is located closest to the originating location of the highest number of access requests associated with the master copy of the data item comprises at least one of:
    determining that a number of hops between the different data store and the originating location is less than a respective number of hops between each of the plurality of data stores and each of one or more remaining locations from the one or more originating locations; and determining that a distance between the different data store and the originating location is less than a respective distance between each of the plurality of data stores and each of the one or more remaining locations from the one or more originating locations.

4. The method of claim 1, further comprising:

determining that the master copy of the data item and a second data item on the distributed storage system have been accessed together a threshold number of times; and after determining the different location on the distributed storage system for storing the master copy of the data item, moving the second data item from a current respective location of the second data item to the different location, the current respective location comprising one of the plurality of data stores on the distributed storage system.

5. The method of claim 1, further comprising:

determining that the master copy of the data item comprises a reference to a particular copy of a second data item stored on the distributed storage system, wherein the particular copy of the second data item comprises one of a respective master copy of the second data item or a replica of the respective master copy of the second data item;

in response to determining the different location on the distributed storage system for storing the master copy of the data item and determining that the master copy of the data item comprises the reference to the particular copy of the second data item, selecting the different location on the distributed storage system for storing the particular copy of the second data item; and moving the particular copy of the second data item from a respective location on the distributed storage system to the different location on the distributed storage system.

6. The method of claim 1, further comprising:

collecting information associated with the distributed storage system, the information comprising at least one of statistics associated with one or more resources, one or more data access restrictions associated with one or more data items on the distributed storage system, one or more events, data access patterns, and network statistics associated with at least one of the distributed storage system and one or more networks associated with the distributed storage system, wherein the one or more resources comprise at least one of a storage node, a compute node, a virtual machine, a software container, a server, a network, and a networking device;

based on the information associated with the distributed storage system, determining a data placement action estimated to improve a data access performance associated with one or more data items on the distributed storage system or improve a performance of the distributed storage system, the data placement action comprising moving at least one data item from at least one storage location to at least one different storage location, the at least one storage location and the at least one different storage location comprising different data stores from the plurality of data stores; and in response to determining the data placement action, moving the at least one data item from the at least one storage location to the at least one different storage location.

7. A system comprising:

one or more processors; and at least one computer-readable storage medium having stored therein instructions which, when executed by the one or more processors, cause the one or more processors to:

determine a current location of a master copy of a data item stored on a distributed storage system, wherein the current location of the master copy of the data item comprises a current data store from a plurality of data stores on the distributed storage system;

determine an access pattern associated with the master copy of the data item, the access pattern comprising one or more originating locations of a set of access requests received by the distributed storage system for the master copy of the data item and a respective number of access requests received from each of the one or more originating locations;

determine, based on the access pattern associated with the master copy of the data item, a different location on the distributed storage system for storing the master copy of the data item, the different location comprising a different data store from the plurality of data stores; and place the master copy of the data item at the different location on the distributed storage system;

wherein determine the different location on the distributed storage system for storing the master copy of the data item comprises:

based on the access pattern associated with the master copy of the data item, identify, from the one or more originating locations, an originating location of a highest number of access requests associated with the master copy of the data item;

determine which of the plurality of data stores is located closest to the originating location of the highest number of access requests associated with the master copy of the data item; and determine that the different data store associated with the different location is located closest to the originating location of the highest number of access requests associated with the master copy of the data item.

8. The system of claim 7, wherein placing the master copy of the data item at the different location on the distributed storage system comprises moving the master copy of the data item from the current data store to the different data store.

9. The system of claim 8, wherein determining that the different data store is located closest to the originating location of the highest number of access requests associated with the master copy of the data item comprises at least one of:

determining that a number of hops between the different data store and the originating location is less than a respective number of hops between each of the plurality of data stores and each of one or more remaining locations from the one or more originating locations; and determining that a distance between the different data store and the originating location is less than a respective distance between each of the plurality of data stores and each of the one or more remaining locations from the one or more originating locations.

10. The system of claim 7, the at least one computer-readable storage medium storing instructions which, when executed by the one or more processors, cause the system to:

determine that the master copy of the data item comprises a reference to a particular copy of a second data item stored on the distributed storage system, wherein the particular copy of the second data item comprises one of a respective master copy of the second data item or a replica of the respective master copy of the second data item;

in response to determining the different location on the distributed storage system for storing the master copy of the data item and determining that the master copy of the data item comprises the reference to the particular copy of the second data item, select the different location on the distributed storage system for storing the particular copy of the second data item; and move the particular copy of the second data item from a respective location on the distributed storage system to the different location on the distributed storage system.

11. The system of claim 7, the at least one computer-readable storage medium storing instructions which, when executed by the one or more processors, cause the system to:

collect information associated with the distributed storage system, the information comprising at least one of statistics associated with one or more resources, one or more data access restrictions associated with one or more data items on the distributed storage system, one or more events, data access patterns, and network statistics associated with at least one of the distributed storage system and one or more networks associated with the distributed storage system, wherein the one or more resources comprise at least one of a storage node, a compute node, a virtual machine, a software container, a server, a network, and a networking device;

based on the information associated with the distributed storage system, determine a data placement action estimated to improve a data access performance associated with one or more data items on the distributed storage system or improve a performance of the distributed storage system, the data placement action comprising moving at least one data item from at least one storage location to at least one different storage location, the at least one storage location and the at least one different storage location comprising different data stores from the plurality of data stores; and in response to determining the data placement action, move the at least one data item from the at least one storage location to the at least one different storage location.

12. A non-transitory computer-readable storage medium having stored therein instructions which, when executed by one or more processors, cause the one or more processors to perform operations comprising:

determine a current location of a master copy of a data item stored on a distributed storage system, wherein the current location of the master copy of the data item comprises a current data store from a plurality of data stores on the distributed storage system;

determine an access pattern associated with the master copy of the data item, the access pattern comprising one or more originating locations of a set of access requests received by the distributed storage system for the master copy of the data item and a respective number of access requests received from each of the one or more originating locations;

determine, based on the access pattern associated with the master copy of the data item, a different location on the distributed storage system for storing the master copy of the data item, the different location comprising a different data store from the plurality of data stores; and place the master copy of the data item at the different location on the distributed storage system;

wherein determine the different location on the distributed storage system for storing the master copy of the data item comprises:

based on the access pattern associated with the master copy of the data item, identify, from the one or more originating locations, an originating location of a highest number of access requests associated with the master copy of the data item;

determine which of the plurality of data stores is located closest to the originating location of the highest number of access requests associated with the master copy of the data item; and determine that the different data store associated with the different location is located closest to the originating location of the highest number of access requests associated with the master copy of the data item.

* * * * *